United States Patent

[11] 3,560,776

[72] Inventors: Vasily Semenovich Kildishev
Ulitsa Piekhanovskaya, 41/43, kv. 55;
Vadim Borisovich Kaplunov, Ulitsa
Bairona, 140/34, kv. 45, Kharkov, U.S.S.R.
[21] Appl No: 819,152
[22] Filed: Apr. 25, 1969
[45] Patented: Feb. 2, 1971

[54] SLOT CLOSERS FOR AN ELECTRICAL MACHINE
5 Claims, 6 Drawing Figs.
[52] U.S. Cl. ............................................. 310/214,
310/86, 310/254
[51] Int. Cl. ........................................................ H02k 3/48
[50] Field of Search ............................................. 310/214,
86, 87, 254, 259

[56] References Cited
UNITED STATES PATENTS
1,396,521  11/1921  Myers. .................... 310/86UX
3,330,977  7/1967  Balke et al. .................. 310/214

Primary Examiner—D. F. Duggan
Attorney—Waters, Roditi, Schwartz & Nissen

ABSTRACT: A stator for an electrical machine is composed of a core with slots containing winding bars completely filling the entire spaces of the core slots and projecting therefrom into slots formed in an insulating cylinder accommodated within the bore of the core. Rigid connectors such as wedges are interposed between the cylinder and the winding bars for securing the bars in the slots. The cylinder may be constituted by a plurality of separate rings in which case separate wedges are employed for each ring in each of the slots thereof.

SLOT CLOSERS FOR AN ELECTRICAL MACHINE

The present invention relates generally to electrical machines, and more particularly to stators of high-power electrical machines.

Known in the present state of the art are designs of the stators of electrical machines, wherein the windings are disposed within slots provided in the stator core and fixed by wedges accommodated within cuts which are located in the upper portions of the slots.

There are likewise known designs of stators wherein the bars of the winding are arranged on the plane surface of the core bore in one layer and are fixed by means of inserted teeth entering cuts in the core.

The designs of the stators featuring the winding arranged within the core and fastened by means of wedges suffer from the following disadvantages.

When the power of the electrical machines increases, and consequently, the depth of the slots also increases, the reactances may be of a considerably high value which adversely affects the performance of the electrical machine involved. A substantial portion of the cross-sectional area of the slot is utilized by the wedges adapted to fasten the winding which impaires the filling factor of the slot, and, consequently, results in increased weight and size of the electrical machine in question. Moreover, the driving of the wedges into the cuts in the slots deteriorates the insulating varnish coating with resultant increased magnetic losses within the core iron by 10 to 15 percent. The cuts adapted for the wedges give rise to substantial local increase in induction.

The designs of the stators featuring their winding rods arranged on the plane surface of the core bore suffer from the following disadvantages.

The air gap between the windings is increased which leads to an increased magnetizing force, and, consequently, to an increased excitation current.

The mechanical fastening of the winding rods is not dependable since in this case the aforementioned winding bars are affected by the total electromagnetic flux due to the absence of the teeth capable of shunting the magnetic flux; apart from the abovesaid, the additional losses occurrable within the copper of the winding crossed by the main magnetic flux are sharply increased.

Moreover, the construction of the frontal components of the winding is made complicated due to the arrangement of the winding bars in one layer.

The disadvantages inherent in the design of the above-mentioned stators have made these stators inapplicable to any modern electrical machine.

It is an object of the present invention to eliminate the above-mentioned disadvantages.

The main object of the invention is to provide a design of the stator for an electrical machine with improved performance which will contribute to an increase in power of said electrical machine.

According to the present invention, this object is accomplished due to the arrangement wherein the stator for the electrical machine involved featuring both the core with the winding wedges which are arranged within the slots of the above-mentioned stator, and a cylinder made of insulating material, the winding bars fill the entire space of the core slot and have a height thereof equal at least to the depth of the core slots, the fastening of the bars being effected by the component members provided between the cylinder and the winding bars.

It is expedient that with a view to fastening the winding bars the fastening wedges are provided in the longitudinal slots between the cylinder and the bars on the outer surface of the above-mentioned cylinder; in this case every longitudinal slot is adjacent to a corresponding slot of the core, thereby forming a continuous cavity, whereas with a view of simplifying the assembly procedure, the entire length of the cylinder is made of separate rings.

The present invention provides the possibility to substantially increase the filling factor of the slot with resultant decrease in the weight of the stator core. Such a design of the stator makes it likewise possible to diminish the magnetic losses occurrable within the core teeth as well as thermal losses within the stator winding which, as a whole, lead to increased power of the electrical machine involved.

The winding bars provided in close proximity to the core bore or removed beyond the winding are not crossed by the main magnetic field, since the magnetic flux in this case branches off to the core teeth featuring normal level of saturation, with the result that the magnetic moment does not affect the winding and the problem concerning the permissible level of additional losses occurrable due to the effect of the radial magnetic flux, is made simplified.

The winding bars are securely fastened both with respect to the radial and tangential directions. The employment of the cylinder accommodated within the core bore to fasten the winding provides the possibility to resort to oil cooling of the stator active component members.

The invention will be described hereinbelow by way of illustration of the exemplary embodiments thereof with due reference to the accompanying drawing wherein.

Figure 1:
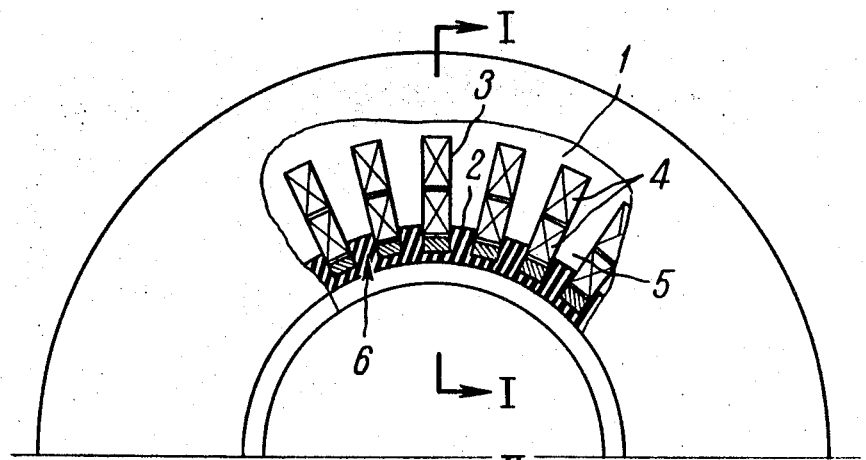
FIG. 1 is a longitudinal sectional view of a stator featuring wedge fastening of the winding bars, according to the present invention.

As can be clearly seen in the drawing, a core 1 of the stator is provided with bores 2 uniformly spaced on the circumference of said core, and slots 3 which accommodate bars 4 of the stator winding. The slots 3 are so made that the depth thereof is less than the height of the bars 4, whereby the bars 4 completely fill the slots 3 of the stator core 1. Such a filling of the slots 3 provides the possibility to diminish the magnetic losses occurrable within teeth 5 of the core 1 as well as the thermal losses within the bars 4 of the stator winding.

Figure 5:
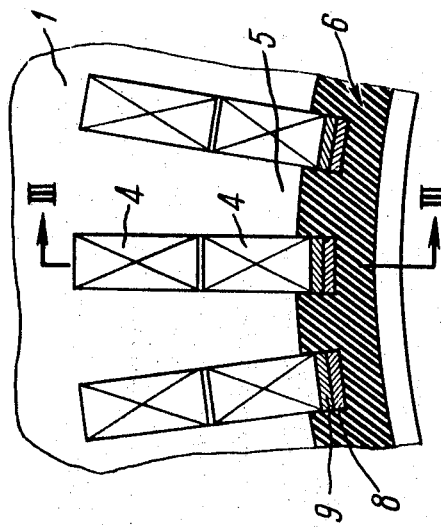
FIG. 5 is a cross-sectional view taken along the winding rods showing the fastening thereof by a pair of wedges.
Figure 3:
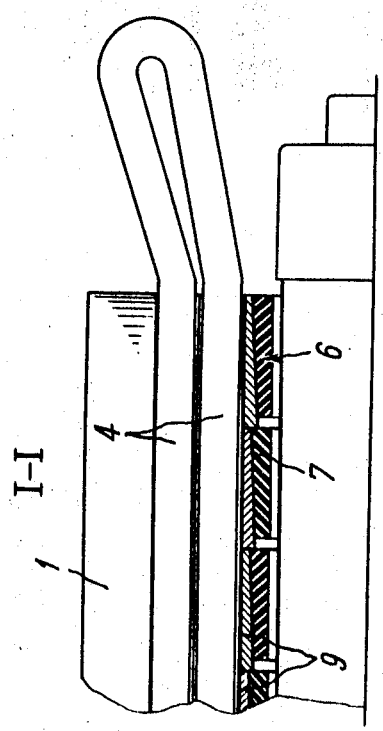
FIG. 3 is a sectional view taken along the line I–I of FIG. 1.

To fix the winding bars 4 in position, provision is made for a cylinder 6 made of insulating material and accommodated within the bore 2 of the core 1. The aforementioned cylinder 6, for the sake of convenience in assembly, may be made of separate rings 7 (cf. FIGS. 3 and 5). The outer surface of cylinder 6 is provided with longitudinal slots 8 each of which is coincident with a respective slot 3 of the stator core 1, thereby forming a continuous cavity. Fastening of the bars 4 is effected by the provision of wedges 9 (or twin wedges 9, (or FIGS. 5 and 6) between the bars 4 and the slots 8.

Figure 2:
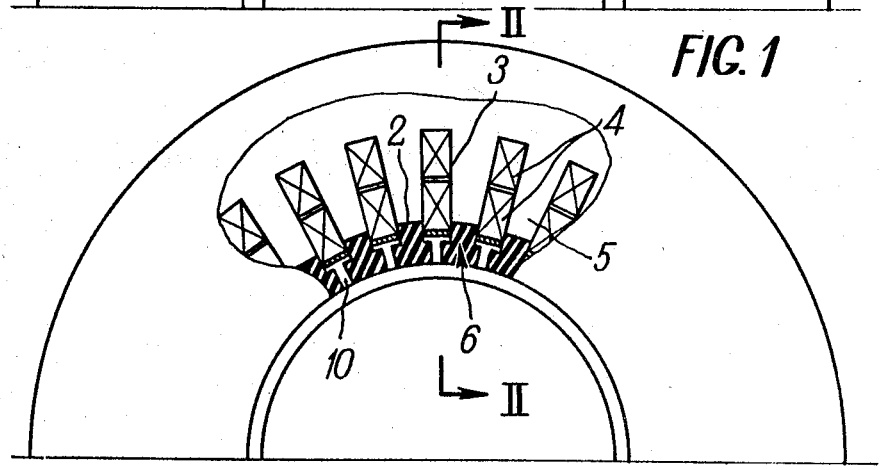
FIG. 2 is a longitudinal sectional view of a stator featuring bolt fastening of the winding bars, according to the present invention.
Figure 4:
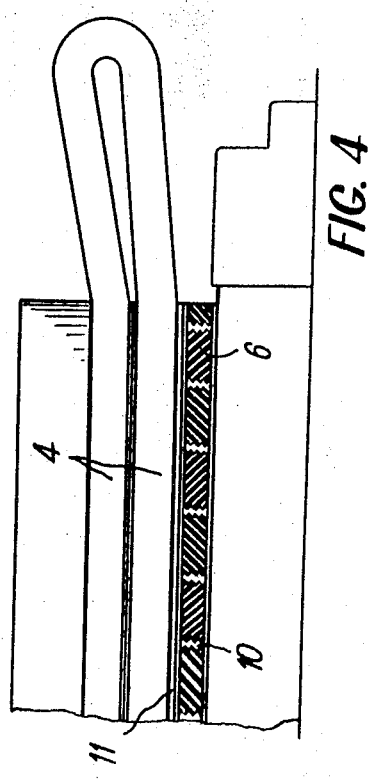
FIG. 4 is a sectional view taken along line II–II of FIG. 2.

Fastening of the winding bars 4 (of FIGS. 2 and 4) may be likewise effected by means of nonmagnetic bolts screwed into threaded openings 10 provided in the wall of the cylinder 6 and arranged in a row along the winding bars 4. The forces developed by the bolts upon the winding bars 4 are likewise imparted to gaskets 11 which are adapted to protect the insulation of the bars 4.

The embodiment of the winding fastening effected through the use of the bolts provides the possibility to resort to oil cooling of the stator active component members, since the cylinder 6 in this case is made as a solid body. The points provided for the fastening bolts are tightened by making use of one of the methods known heretofore.

Thus, by making use of the fastening wedges 9 or the fastening bolts, there is obtained a reliable fastening of the winding within the slots 3 of the stator core 1.

Figure 6:
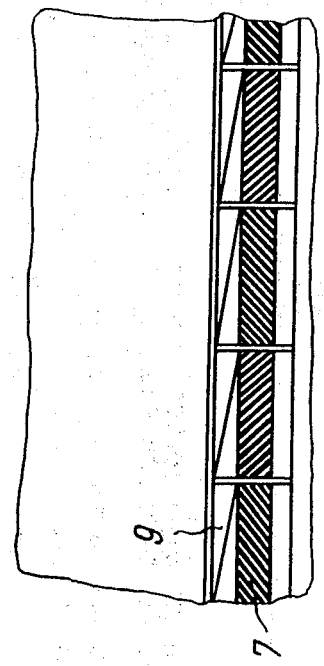
FIG. 6 is a sectional view taken along line III–III of FIG. 5.

If the height of the bars is larger than the depth of the core slot, the fastening may be effected by making use of the cylinder. In this case the wedges in the longitudinal cross section are of the double arrangement as shown in FIG. 6.

We claim:
1. A stator for an electrical machine, comprising: a core with a bore and slots; winding bars having a height greater than the depth of the core slots and filling the entire spaces of said core slots and projecting therefrom; a cylinder of insulating material accommodated within the bore of said core, said cylinder having an outer surface with slots adjoining respective slots of said core and receiving the projecting portions of the winding bars; and rigid connector means located between said cylinder and said winding bars for securing said bars in said slots, said rigid connector means being wholly confined within the slots in said cylinder.

2. A stator for an electrical machine as claimed in claim 1, wherein said means for securing said bars in said slots comprises fastening wedges accommodated within the slots on the outer surface of said cylinder.

3. A stator for an electrical machine as claimed in claim 2, wherein said cylinder is constituted by a plurality of separate rings.

4. A stator for an electrical machine as claimed in claim 3, wherein said fastening wedges are present in a respective plurality as said separate rings to provide a separate wedge in a respective slot in each ring.

5. A stator for an electrical machine as claimed in claim 4, wherein each wedge is constituted by two wedge elements.